United States Patent [19]

Pärisch et al.

[11] Patent Number: 4,637,116
[45] Date of Patent: Jan. 20, 1987

[54] METHOD FOR FASTENING A COVERING PART AT A FRAME PART

[75] Inventors: Jochen Pärisch, Herrenberg; Werner Herlemann, Aidlingen, both of Fed. Rep. of Germany

[73] Assignee: Daimler-Benz Aktiengesellschaft, Stuttgart, Fed. Rep. of Germany

[21] Appl. No.: 796,061

[22] Filed: Nov. 8, 1985

[30] Foreign Application Priority Data

Nov. 13, 1984 [DE] Fed. Rep. of Germany ....... 3441349

[51] Int. Cl.⁴ .............................................. B23P 11/00
[52] U.S. Cl. .................................... 29/441 R; 29/509; 29/520; 228/115; 228/136; 403/142; 403/270; 403/282
[58] Field of Search ............. 29/520, 509, 526 R, 29/441 R, 149.5 B; 228/136, 135, 139, 115; 403/282, 270, 407, 408, 115, 142; 219/107, 99

[56] References Cited

U.S. PATENT DOCUMENTS

| 1,854,730 | 4/1932 | Bell | 29/520 UX |
|---|---|---|---|
| 1,960,042 | 5/1934 | Andrus | 219/107 X |
| 2,177,191 | 10/1939 | Sandberg | 29/520 |
| 3,004,139 | 10/1961 | Dash | 219/99 |
| 3,188,731 | 6/1965 | Sweeney | 29/460 X |
| 3,340,379 | 9/1967 | Sweeney | 219/99 |
| 3,416,221 | 12/1968 | Henchert | 29/520 X |
| 4,102,032 | 7/1978 | Pringle | 29/520 |
| 4,408,708 | 10/1963 | Delcour | 228/139 |
| 4,494,898 | 1/1985 | Brownbill | 29/520 X |

FOREIGN PATENT DOCUMENTS

| 1990688 | 5/1968 | Fed. Rep. of Germany . |
| 2851939 | 12/1980 | Fed. Rep. of Germany . |
| 356305 | 9/1931 | United Kingdom .................. 29/520 |

Primary Examiner—Charlie T. Moon
Attorney, Agent, or Firm—Craig & Burns

[57] ABSTRACT

For fastening a cover part at a frame part in which both parts have at least a metallic frame structure, spherical segments formed out of the frame part with fasteners in the form of balls are provided while the counter fasteners are constructed as collars which are components of the cover part and extend angularly bent in the direction of the frame part. After inverting the collars over the balls, each collar is pressed flat by a predetermined amount under straightening during a pressing operation in which the frame part serves as supporting surface so that at the end of the deformation operation, the collar is supported at the ball.

2 Claims, 2 Drawing Figures

FIG. 1
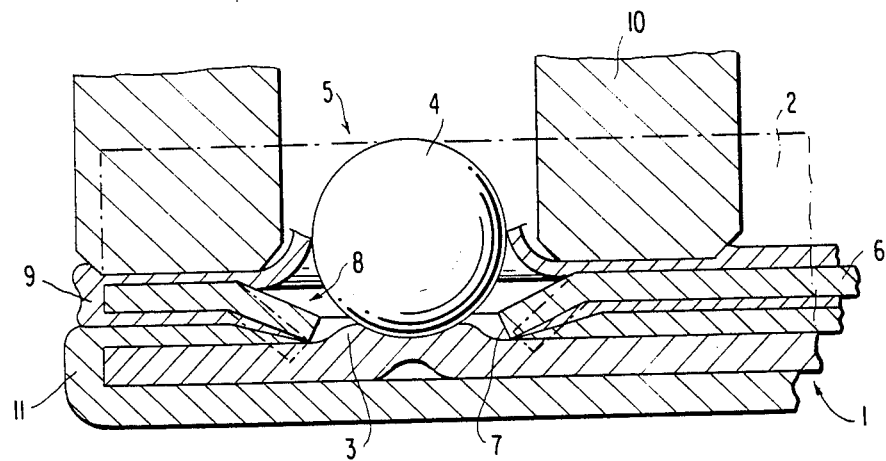
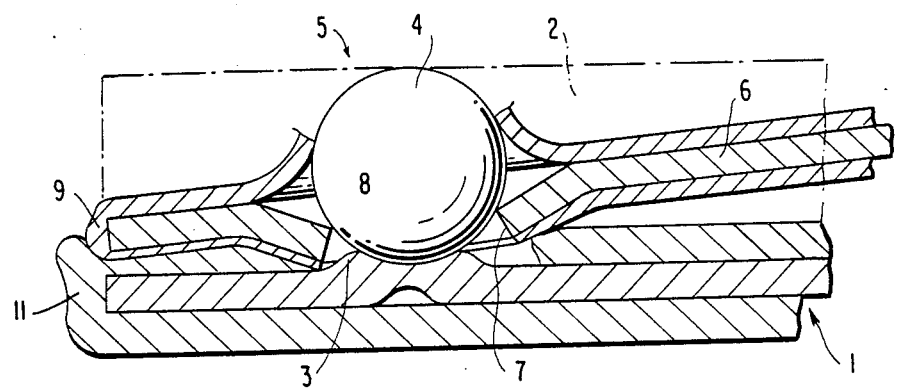
FIG. 2

METHOD FOR FASTENING A COVERING PART AT A FRAME PART

The present invention relates to a method for fastening a covering part at a frame part with the aid of fasteners each having a ball head and secured at one part, which are supported engaging from below at coordinated counter fasteners at the other part.

Such a manner of fastening is disclosed in the West German Patent DE-OS No. 28 51 939 in connection with a sliding roof for a motor vehicle. The fastener having the ball head is provided with a foot portion anchored in the elastic material of the covering part and also the sleeve-shaped counter fastener consists of elastic material whereby it bead-shaped end area is initially expanded during the fastening operation and then supports itself with prestress at the ball head—engaging the same from below.

It is the object of the present invention to provide an approach which makes it possible to apply the known fastening principle also with parts which include at least one support frame consisting of metal.

For that reason, a method for fastening a covering part at a frame part with the aid of fasteners each having a ball head and secured at one part is proposed which are supported engaging from below at coordinated counter fasteners at the other part whereby, according to the present invention, spherical segments formed out of the frame part are provided with fasteners constructed as balls and the counter fasteners in the form of ring-shaped collars formed out of the cover part and angularly bent in the direction of the frame part are placed over the balls, and whereby each collar is pressed flat by a predetermined amount under straightening by a following pressing operation in which the frame part serves as support surface.

If the cover part and/or the frame part is thereby provided with a covering, then the covering is temporarily compressed during the pressing operation and thereafter again expands. The flattening of the collar can thereby be smaller than with noncovered parts.

If only one side of a cover part is fastened in the manner described above, then it is pivotal with respect to the frame part because each fastening place acts as ball joint.

These and other objects, features and advantages of the present invention will become more apparent from the following description when taken in connection with the accompanying drawing which shows, for purposes of illustration only, two embodiments in accordance with the present invention, and wherein:

FIG. 1 is a cross-sectional view through a ball fastener in accordance with the present invention during deformation of the coordinated collar; and FIG. 2 is a cover part, fastened only on one side, in its raised position.

Referring now to the drawing wherein like reference numerals are used throughout the two views to designate like parts, a spherical segment or socket 3 which is formed out of a frame part generally designated by reference numeral 1 in the form of an angle rail 2, receives a fastener generally designated by reference numeral 5 constructed as ball 4 by a pressing welding operation. A cover part 6 having a collar 7 angularly bent in the direction of the frame part 1 is mounted over the ball 4 as counter fastener 8 whereby the collar opening is slightly larger than the diameter of the ball 4 which, in practice, amounts to about 5 mm.

If the cover part 6—as illustrated—is provided with a covering 9, then the covering 9 is apertured by the collar wall when forcibly mounting the cover part 6 over the ball 4 and a temporary compressing of the covering 9 of the cover part 6 takes place during the subsequent pressing operation in which, according to FIG. 1, a press or stamp 10 is applied and the frame part 1 serves as support surface, and also the covering 11 of the frame part 1 is also compressed during this pressing operation so that after removal of the load, the collar 7 which has now been flattened by a predetermined amount with respect to its starting position indicated in dash and dotted lines, abuts at the ball 4 with prestress.

Cover parts 6 of large area can also be fastened by several fastening elements each consisting of a ball 4 and a collar 7 and arranged in the manner described hereinabove. However, it is also possible to fasten a cover part 6 only at one side so that—as shown in FIG. 2—, the fastening place acts as ball joint and the cover part 6 can be pivoted away from the frame part 1.

While we have shown and described only two embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. a method for fastening a cover part at a frame part with the aid of fastening means each having a ball head secured at one part and engaging from below at coordinated counter fastener means at the other part, comprising the steps of providing spherical segments formed out of the frame part with fastener means constructed as balls, mounting over the balls counter fastener means in the form of ring-shaped collar means angularly bent in the direction of the frame part and formed out of the cover part, and thereafter pressing flat each collar means by a predetermined amount under straightening thereof during a subsequent pressing operation in which the frame part serves as support surface.

2. A method according to claim 1, wherein the balls are fastened to the spherical segments by press-welding.

* * * * *